United States Patent
Yaginuma et al.

(10) Patent No.: US 6,495,190 B1
(45) Date of Patent: Dec. 17, 2002

(54) CELLULOSE-CONTAINING COMPOSITE

(75) Inventors: Yoshihito Yaginuma, Nobeoka (JP);
Etsuo Kamada, Nobeoka (JP);
Nobuyoshi Mochihara, Nobeoka (JP);
Kouichirou Enatsu, Nobeoka (JP)

(73) Assignee: Asahi Kasei Kabushiki Kaisha (JP)

(*) Notice: Subject to any disclaimer, the term of this patent is extended or adjusted under 35 U.S.C. 154(b) by 0 days.

(21) Appl. No.: 09/582,884

(22) PCT Filed: Jan. 8, 1999

(86) PCT No.: PCT/JP99/00028

§ 371 (c)(1),
(2), (4) Date: Jul. 5, 2000

(87) PCT Pub. No.: WO99/35190

PCT Pub. Date: Jul. 15, 1999

(30) Foreign Application Priority Data

Jan. 9, 1998 (JP) .......................... 10-002805

(51) Int. Cl.[7] ............................ A23L 1/05; A23L 1/054
(52) U.S. Cl. ..................................... 426/615; 426/573
(58) Field of Search ................................ 426/573, 615

(56) References Cited

U.S. PATENT DOCUMENTS

| | | | | |
|---|---|---|---|---|
| 3,573,058 A | * | 3/1971 | Tiemstra ..................... | 426/573 |
| 4,264,637 A | * | 4/1981 | Braveman .................... | 426/573 |
| 4,378,381 A | * | 3/1983 | Turbak et al. .............. | 426/573 |
| 5,387,423 A | * | 2/1995 | Emoto et al. ............... | 426/573 |
| 5,633,030 A | * | 5/1997 | Marrs et al. ................ | 426/573 |

FOREIGN PATENT DOCUMENTS

| | | |
|---|---|---|
| JP | 51-15673 A | 7/1978 |
| JP | 57-14771 B | 4/1979 |
| JP | 55-34006 A | 3/1980 |
| JP | 6-75474 B | 11/1990 |
| JP | 5-91833 A | 4/1993 |
| JP | 6-135838 A | 5/1994 |
| JP | 7-70365 A | 3/1995 |
| JP | 7-173332 A | 7/1995 |
| JP | 7-268129 A | 10/1995 |
| JP | 8-151481 A | 6/1996 |
| JP | WO 98/33394 | 8/1998 |

OTHER PUBLICATIONS

Sogo Shokuhin Jiten (6th Ed.), p. 617–618 (1989).
Denpun Kagaku, 37 (2), 107–114 (1990).

* cited by examiner

Primary Examiner—Helen Pratt
(74) Attorney, Agent, or Firm—Pennie & Edmonds LLP

(57) ABSTRACT

A cellulose-containing composite contains 20–99% by weight of a fine cellulose and 1–80% by weight of at least one low-viscosity water-soluble dietary fiber selected from the group consisting of 1) a hydrolyzed gallactomannan, 2) an indigestible dextrin and 3) a mixture of a polydextrose and xanthan gum and/or gellan gum, wherein the total amount of gellan gum and xanthan gum is 0.1% by weight or more but less than 3% by weight of the composite, in which composite the average particle size of the fine cellulose is 30 $\mu$m or less when the composite is dispersed in water.

8 Claims, No Drawings

CELLULOSE-CONTAINING COMPOSITE

TECHNICAL FIELD

The present invention relates to a cellulose-containing composite. More particularly, the present invention relates to a cellulose-containing composite which comprises a particular fine cellulose and a low-viscosity water-soluble dietary fiber and which is superior in feeling when taken into the mouth, and which is also superior in shape retainability, and fluidity when made into a liquid food, etc. and further in effects as dietary fiber or as oil and fat substitute.

BACKGROUND ART

Cellulose has been used in foods for various purposes of, for example, imparting suspension stability, emulsion stability, shape retainability or cloudiness, or for adding dietary fiber. However, when cellulose is used alone as a stabilizer or the like, there have been cases that the addition effect is insufficient or the cellulose-added food gives slightly rough feeling to the tongue. Natural dietary fibers are ordinarily a composite of a water-insoluble dietary fiber and a water-soluble dietary fiber and these two kinds of dietary fibers differ in action in the intestinal tract. Therefore, the dietary fiber material used in food is preferred to be a combination of the above two kinds of dietary fibers. However, neither dietary fiber material nor combined dietary fiber material is currently available which has a low viscosity suitable for use in food, which has good feeling when taken into the mouth, and which has high stability.

In JP-B-57-14771 is described a composite comprising a microcrystalline cellulose, a dispersing agent (a gum) and a disintegrating agent in particular proportions. The composite has a high viscosity depending upon the kind of gum used and, therefore, it has given paste-like viscous feeling when taken into the mouth, in some cases. For example, Avicel RC-591 (trade name) (a product of Asahi Chemical Industry Co., Ltd.), which is a commercially marketed crystalline cellulose preparation, comprises a microcrystalline cellulose and, as a dispersing agent, sodium carboxymethylcellulose and, when dispersed in water in a 3% concentration, gives a high viscosity of 1,200 mPa·.

In JP-B-6-75474 is described a composition comprising a microcrystalline cellulose and galactomannan gum. The galactomannan gum used in this composition is an ordinary gum not subjected to any decomposition treatment and acts as a binder for the microcrystalline cellulose. Therefore, when the composition is stirred in water, the composition only swells, causes no disintegration into particles, and maintains the original state. Therefore, the composition has low suspension stability in water although it gives in-mouth feeling similar to that of fat and is suitable as a fat substitute for use in food.

In JP-A-6-135838 is described an oral or tube fed nutritious composition comprising a microcrystalline cellulose (as a water-insoluble dietary fiber) and an enzymatically hydrolyzed guar gum (as a water-soluble dietary fiber). In this composition, the microcrystalline cellulose and the enzymatically hydrolyzed guar gum are not in a composite form but in a simple mixture; therefore, the rough feeling of the microcrystalline cellulose is not sufficiently suppressed and the in-tube flowing-down property has not been sufficient.

In JP-A-7-173332 and JP-A-7-268129 are described composites comprising a fine cellulose and a hydrophilic substance and/or a water-soluble gum, which contain particles having particle diameters of 10 μm or more, in an amount of 40% or less and which have a colloidal content (which is a yardstick for the amount of fine particles) of 65% or more. In the literature, polydextrose is shown as an example of the hydrophilic substance, and xanthan gum is shown as an example of the water-soluble gum. These composites, however, have a high colloidal content and accordingly high viscosity; therefore, when used in a food such as a drink or the like in an amount of 1% or more, they give viscous feeling and, when used in a tube fed liquid diet, it has been difficult to allow them to flow down at a sufficient speed.

In the above-mentioned JP-A-7-173332 and JP-A-7-268129 are shown dextrin as an example of the hydrophilic substance. Dextrin is a group of intermediates formed when starch is subjected to partial hydrolysis by the action of acid, enzyme, heat or the like, and it is often referred to in industry, as pyrodextrin obtained by dry method (Sogo Shokuhin Jiten (6th edition), pp. 617-618 (1989), edited by Yoshito Sakurai and published from Dobun Shoin). In the above literature, hydrolyzed starch is also mentioned; therefore, the dextrin mentioned in the literature refers to pyrodextrin. Incidentally, as is well known in the art, pyrodextrin includes white or yellow dextrin obtained by subjecting starch to pyrolysis using an acid catalyst, and British gum obtained by subjecting starch to pyrolysis using no acid, and each dextrin contains an indigestible component. However, the content of the indigestible component is at most about 40%, and more than half is digestible (K. Ohkuma et al., Denpun Kagaku, 37 (2), pp. 107–114 (1990)). That is, substances generally known as dextrin have been digestible. In contrast, the dextrin usable in the present invention which is indigestible as mentioned later, is different from the dextrin mentioned in the above literature, and has a meaning as a dietary fiber material in the present invention because it is indigestible.

In JP-A-7-70365 is described a composite of a fine cellulose and a polydextrose, which contains particles having particle diameters of 10 μm or more, in an amount of 40% or less and which has a colloidal content of 50% or more. This composite has a low viscosity but contains no stabilizer such as gellan gum or the like; therefore, it has no long-term suspension stability. Moreover, in the composite, the cellulose particles are fine and tend to interact with milk protein, etc., and the polydextrose has no sufficient effect for reducing of the interaction; therefore, the system using the composite has tended to cause flocculation. In the literature is also described the use of dextrin. This dextrin, however, is different from the indigestible dextrin used in the present invention, for the same reason as mentioned above.

In WO 98/33394 is described a texture agent for food, obtained by mixing a microcrystalline cellulose and a polydextrose in water and drying the resulting mixture. The polydextrose is used only in the claims of the literature, and only maltodextrin is used in the Examples, etc. Therefore, the effect of the composition using a polydextrose is unclear from the above literature alone. However, the composition using a polydextrose is presumed to have insufficient stability at a low concentration, because the composition is thought to have the same effect as the composition using maltodextrin and because it is shown in the literature that the composition using maltodextrin gives a low viscosity at a low concentration but gives rise to precipitation of cellulose and resultant separation into two layers. The literature also has a description regarding a composition using xanthan gum in combination. Since the amount of xanthan gum used is 3% or more, the composition has a high viscosity of 525 mPa·s or more when made into a 2% suspension. In WO 98/33394 is disclosed neither data nor technical idea of cellulose-containing composite of low viscosity and high stability.

DISCLOSURE OF THE INVENTION

The present invention is intended to provide a cellulose-containing composite which has a low viscosity and excellent suspension stability when dispersed in water, which is good in feeling when taken into the mouth, superior suspension stability, shape retainability, and fluidity when made into a tube fed liquid diet, etc., and which has an effect of water-insoluble dietary fiber and an effect of water-soluble dietary fiber; and a food composition containing the composite.

The present inventors found out that a composite comprising a particular fine cellulose and a low-viscosity water-soluble dietary fiber has a low viscosity when dispersed in water and, since the fine cellulose has a small average particle size, gives no viscous feeling when used in foods and contributes to food stability such as shape retainability or the like. The present invention has been completed based on these findings.

The present invention lies in the following embodiments.

(1) A cellulose-containing composite comprising 20–99% by weight of a fine cellulose and 1–80% by weight of at least one low-viscosity water-soluble dietary fiber selected from the group consisting of 1) a hydrolyzed galactomannan, 2) an indigestible dextrin and 2) a mixture of a polydextrose and xanthan gum and/or gellan gum (the total amount of gellan gum and xanthan gum is 0.1% by weight or more but less than 3% by weight of the composite), in which composite the average particle size of the fine cellulose is 30 μm or less when the composite is dispersed in water.

(2) A composite according to the above (1), which has a viscosity of 300 mPa·s or less when made into a suspension of 3% by weight of the composite.

(3) A composite according to the above (1), which has a colloidal content of less than 65% when the low-viscosity water-soluble dietary fiber is a mixture of a polydextrose and xanthan gum and/or gellan gum.

(4) A composite according to the above (1), which has a colloidal content of less than 65%.

(5) A composite according to the above (1), wherein the water-soluble dietary fiber is a mixture of a polydextrose and xanthan gum and/or gellan gum (the total amount of gellan gum and xanthan gum is 0.1% by weight or more but less than 3% by weight of the composite) and which composite has a colloidal content of less than 65%.

(6) A process for producing a cellulose-containing composite, which comprises mixing, in a wet state, 20–99% by weight of a fine cellulose and 1–80% by weight of at least one low-viscosity water-soluble dietary fiber selected from the group consisting of 1) a hydrolyzed gallactomannan, 2) an indigestible dextrin and 3) a mixture of a polydextrose and xanthan gum and/or gellan gum (the total amount of gellan gum and xanthan gum is 0.1% by weight or more but less than 3% by weight of the composite) and then drying the resulting mixture. This process is suitable as a process for producing any of the cellulose-containing composites of the above (1) to (5).

(7) A process for producing a cellulose-containing composite, which comprises simultaneously mixing and attriting, in a wet state, 20–99% by weight of a depolymerized cellulose and 1–80% by weight of at least one low-viscosity water-soluble dietary fiber selected from the group consisting of 1) a hydrolyzed gallactomannan, 2) an indigestible dextrin and 3) a mixture of a polydextrose and xanthan gum and/or gellan gum (the total amount of gellan gum and xanthan gum is 0.1% by weight or more but less than 3% by weight of the composite) and then drying the resulting mixture. This process is suitable as a process for producing any of the cellulose-containing composites of the above (1) to (5).

(8) A food containing a cellulose-containing composite set forth in any of the above (1) to (5).

(9) A food containing a cellulose-containing composite set forth in any of the above (1) to (5), wherein the composite is disintegrated and dispersed in the form of individual fine cellulose particles.

(10) A food according to the above (9), which is a tube fed liquid diet.

BEST MODE FOR CARRYING OUT THE INVENTION

The cellulose-containing composite of the present invention is not only a mixture of the powder of fine cellulose with the powder of a low-viscosity water-soluble dietary fiber or the like but also the particles which contain, within one particle, one or more fine cellulose particles and the low-viscosity water-soluble dietary fiber, and optionally other components, wherein the low-viscosity water-soluble dietary fiber is present around any one of the fine cellulose particles or dried powder composed of a group of such particles.

The cellulose-containing composite of the present invention, when placed in water and stirred, is not dispersed in water in the form of the composite, but is disintegrated and dispersed in the form of individual fine cellulose particles.

When the present cellulose-containing composite is placed in water in a 1% concentration and dispersed by stirring, the fine cellulose of the composite has an average particle size of 30 μm or less. In this case, the proportion of fine cellulose particles having particle sizes of 10 μm or more is preferably 80% or less, in the particle size distribution. More preferably, the average particle size is 20 μm or less and the proportion of particles having particle sizes of 10 μm or more is 70% or less. Even more preferably, the average particle size is 3–10 μm and the proportion of particles having particle sizes of 10 μm or more is 50% or less. When the average particle size is more than 30 μm, the composite gives rough feeling to the tongue when taken into the mouth in the form of a drink or a food, and further is low in properties such as stability and the like. As the average particle size of fine cellulose is made smaller, there tends to be less rough feeling to the tongue. However, when the average particle size is less than 3 μm, the amount of colloidal content and thus the viscosity increases in some cases, which case is not desirable.

The cellulose-containing composite of the present invention has a low viscosity. It means that the composite has a low viscosity, preferably 300 mPa·or less as measured for a 3% aqueous dispersion. When the viscosity is more than 300 mPa·, the composite tends to have viscous feeling when taken into the mouth. When the composite is made into, in particular, a tube fed liquid diet, it is difficult to allow the liquid diet to flow at a certain or high speed, specifically at a speed of 200 g/hr or higher when a liquid diet containing about 1.5% of the composite is allowed to flow down through a tube having an inner diameter of 1 mm or less. Further, the tube fed liquid diet tends to clog the tube at the clamp portion when the flow speed is adjusted to a certain value, for example 170 g/hr, by throttling the clamp. The viscosity is preferably 100 mPa·or less, more preferably 50 mPa·or less.

The fine cellulose in the present invention is cellulose particles wherein the average particle size is 30 μm or less. In this case, the proportion of fine cellulose particles having particle sizes of 10 μm or more is 80% or less in the particle size distribution. Preferably, the average particle size is 20 μm or less and the proportion of fine cellulose particles having particle sizes of 10 μm or more is 70% or less. More preferably, the average particle size is 3–10 μm and the proportion of fine cellulose particles having particle sizes of 10 μm or more is 50% or less.

The hydrolyzed galactomannan is obtained by using, as the raw material, guar gum, locust bean gum or the like, all of which can be collected from bean seeds and are a galactomannan, and subjecting it to partial decomposition of galactomannan main molecular chain with an enzyme or the like. Since the galactomannan main molecular chain is decomposed, the hydrolyzed galactomannan is characterized in that its aqueous solution has a low viscosity as compared with the galactomannan before decomposition. The hydrolyzed galactomannan gives a viscosity of 300 mPa·or less, preferably 100 mpas or less, particularly preferably 10 mPa·s or less when dissolved in water in a 10% concentration. Incidentally, guar gum not subjected to any enzymatic hydrolysis gives a high viscosity of about 3,000 to 4,000 mPa·at a 1% concentration. Preferred as the hydrolyzed galactomannan is a guar gum enzymatic hydrolysis product for the availability. Its commercial products include "Sunfiber" (trade name) (a product of Taiyo Kagaku Co., Ltd.), "Fiberon S" (trade name) (a product of Dainippon Pharmaceutical Co., Ltd.), etc.

The indigestible dextrin is obtained, for example, by heating a starch in the presence of an acid to obtain a pyrodextrin and then subjecting the pyrodextrin to enzymatic hydrolysis or further to fractionation with an ion exchange resin. The indigestible dextrin is an indigestible substance of highly branched structure wherein the dietary fiber has an average molecular weight of about 500 to 3,000, the glucose residue is bonded by an α-1,4-, α-1,6-, β-1,2-, β-1,3- or β-1,6-glucoside bond, and part of the reducing terminal is levoglucosan (1,6-anhydroglucose). Commercial products of the sparingly digestible dextrin include "Pine Fiber" (trade name), "Fibersol 2" (trade name) (both are products of Matsutani Chemical Industry Co., Ltd.), etc. These products are characterized in that they give a low viscosity when dissolved in water and, unlike ordinary starches, are indigestible. In the present invention is used an indigestible dextrin which gives an aqueous solution of low viscosity similar to that given by the hydrolyzed galactomannan. As starches generally giving a low viscosity aqueous solution, there are hydrolyzed starch (HCS: hydrolyzed cereal solid), dextrin and maltodextrin; however, these are different from the indigestible dextrin used in the present invention because they are digestible. In the present invention is used an indigestible dextrin containing a dietary fiber component, i.e. an indigestible component in an amount of 50% or more, preferably 70% or more.

Polydextrose is a glucose polymer in which glucose molecules are randomly bonded to one another and which is highly branched. The polydextrose is hardly digested by human digestive enzymes and therefore functions as a dietary fiber. Polydextrose has a relatively low molecular weight, is well soluble in water and gives an aqueous solution of low viscosity; therefore, the polydextrose is in wide use as a water-soluble dietary fiber. Polydextrose can be produced, for example, by mixing glucose with a small amount of sorbitol, adding a small amount of citric acid, and heating the resulting mixture under reduced pressure. As usable commercial products, there are "Litesse", "Litesse II", "Litesse III" (all are trade names and products of Cultor Food Science Co., Ltd.), etc.

Polydextrose gives about the same low viscosity as the hydrolyzed galactomannan or the indigestible dextrin; however, being inferior in stability per se, it must be used in admixture with xanthan gum and/or gellan gum.

Xanthan gum has such a structure that the main chain has a molecular structure similar to that of cellulose wherein glucose residues are bonded in a straight chain by β-1,4-glucoside bond, and that trisaccharides formed by bonding of α-D-mannose, β-D-glucuronic acid and β-D-mannose are bonded, as side chains, to every other one of the glucose residues of the main chain. To the trisaccharide are bonded acetyl groups and pyruvic acid groups. Xanthan gum has a molecular weight of about 1,000,000 or more.

Gellan gum is a straight chain polymer containing, as constituent units, four kinds of saccharide molecules, i.e. β-D-glucose having 1,3-bond, β-D-glucuronic acid having 1,4-bond, β-D-glucose having 1,4-bond and α-L-rhamnose having 1,4-bond, wherein one glyceryl group and 1/2 (on an average) acetyl group are bonded to the glucose residue having 1,3-bond. This gellan gum is called native type gellan gum. It has a molecular weight of about 600,000 to 700,000. As usable commercial products, there are "Kelcogel LT-100" (trade name) (a product of San-Ei Gen F.F.I., Inc.), etc.

Both xanthan gum and gellan gum are characterized in that they are soluble in water and give an aqueous solution of high viscosity. Xanthan gum and gellan gum may be mixed with polydextrose singly or in admixture. In the mixture with polydextrose, Xanthan gum and/or gellan gum is used in an amount of preferably 10% by weight or less. In the present invention, there is used, as such a mixture, one giving, when made into a 1% aqueous solution of Xanthan gum and/or gellan gum, a viscosity of 350 mPa·s or less, preferably 100 mPa·s or less, particularly preferably 10 mPa·s or less. The total amount of gellan gum and xanthan gum used must be 0.1 to 3% by weight of the present composite. When the total amount is less than 0.1% by weight, the resulting composite does not have satisfactory stability. When the total amount is more than 3% by weight, increased stability is obtained but low viscosity is impaired.

The cellulose-containing composite of the present invention comprises 20-99% by weight of a fine cellulose and 1–80% by weight of at least one low-viscosity water-soluble dietary fiber selected from the group consisting of 1) a hydrolyzed galactomannan, 2) an indigestible dextrin, and 3) a mixture of a polydextrose and xanthan gum and/or gellan gum (the total amount of gellan gum and xanthan gum is 0.1% by weight or more but less than 3% by weight of the composite). When the amount of the fine cellulose is less than 20% by weight, the composite shows no sufficient effect as a stabilizer when used, for example, for imparting shape retainability in baking a cake. When the amount of the fine cellulose is more than 99% by weight, the composite gives rough feeling to the tongue or dry (not moist) feeling in the mouth. When the amount of the low-viscosity water-soluble dietary fiber is less than 1% by weight, the fine cellulose of the composite is not dispersed into individual particles when the composite is placed in water and stirred. When the amount of the low-viscosity water-soluble dietary fiber is more than 80% by weight, the composite shows no sufficient effect as a stabilizer and moreover gives viscous feeling to the tongue.

The cellulose-containing composite of the present invention comprises preferably 40–90% by weight of a fine cellulose and 10–60% by weight of a low-viscosity water-soluble dietary fiber, particularly preferably 50–85% by weight of a fine cellulose and 15–50% by weight of a low-viscosity water-soluble dietary fiber.

In the cellulose-containing composite of the present invention, it is possible to as necessary use, besides the fine cellulose and the low-viscosity water-soluble dietary fiber, various components usable in foods, such as monosaccharide, oligosaccharide, sugar alcohol, starch, soluble starch, hydrolyzed starch, oil and fat, protein, table salt, other salt (e.g. phosphate), emulsifier, thickener and stabilizer, acidulant, spice, food color and the like. In order to control, in particular, the dispersing state of the composite, it is effective to use a thickener and stabilizer used in foods (e.g. xanthan gum, carrageenan, sodium carboxymethylcellulose, pectin or gellan gum), a saccharide and a starch (e.g. soluble starch or hydrolyzed starch), a dietary fiber (e.g. hydrolyzed pectin) singly or in combination. These components may be added during or after production of the present composite. The amounts of these components used should be appropriately determined in view of the required balance of functions (e.g. stability) and viscosity; however, when a hydrolyzed galactomannan or an indigestible dextrin is used as the low-viscosity water-soluble dietary fiber, use of 3% or less of xanthan gum or 1% or less of gellan gum can give a favorable result. A particularly preferred amount of the above components is 0.1 to 2.5% by weight based on the composite.

The cellulose-containing composite of the present invention is preferred to have a low colloidal content. In the present invention, "colloidal content" is a physical property value that is obtained unambiguously by the method disclosed on page 26, line 25 through page 27, line 27, infra, for the fine cellulose composite according to the present invention. Since a high colloidal content gives a high viscosity, the colloidal content is preferably 85% or less, more preferably less than 65%, particularly preferably 5 to 50%.

Also, when the present composite comprises 20–99% by weight of a fine cellulose and 1–80% by weight of a mixture of a polydextrose and xanthan gum and/or gellan gum (the total amount of gellan gum and xanthan gum is 0.1% by weight or more but less than 3% by weight of the composite), the colloidal content is preferred to be less than 65%. A colloidal content of 65% or higher results in a high viscosity and an increased reactivity with milk protein particles in an acidic environment (this invites reduced stability). Therefore, the colloidal content is preferably 5 to 50%, particularly preferably 10 to 40%.

The present composite comprising a fine cellulose and a low-viscosity water-soluble dietary fiber is not a mere mixture of a powdery fine cellulose and a powdery low-viscosity water-soluble dietary fiber, but is a composite obtained by mixing a fine cellulose and a low-viscosity water-soluble dietary fiber in a wet state, that is, in a slurry, paste, gel or cake state and then drying the resulting mixture. It is important that by conducting the mixing in a wet state, the surfaces of the fine cellulose particles are made well compatible with the low-viscosity water-soluble dietary fiber. It is speculated that after the drying step, an interaction occurs between the fine cellulose particles and the low-viscosity water-soluble dietary fiber and hence, in case these fine cellulose particles are dispersed into individual particles by stirring in water, a part of the low-viscosity water-soluble dietary fiber is remained attached to the surface of the fine cellulose particles. As a result, the aqueous dispersion of the composite has a decreased viscosity and shows reduced clogging at the portion of a clamp when flowing down in a tube, than a simple mixture of the above components. The water content in the mixture before drying is preferably about 30% by weight or more of the total weight of the mixture. A low water content is not preferred because a longer time is required for sufficient mixing of the fine cellulose and the low-viscosity water-soluble dietary fiber. The water content is more preferably about 50% or more.

The process for producing the cellulose-containing composite of the present invention is described specifically.

The cellulose-containing composite of the present invention can be obtained, for example, by subjecting a cellulose material (e.g. wood pulp, refined linters, regenerated cellulose or cereal- or fruit-derived vegetable fiber) to a depolymerization treatment (e.g. acid hydrolysis, alkali oxidative decomposition, enzymatic hydrolysis, steam explosion decomposition, hydrolysis by subcritical or supercritical water or a combination thereof) to obtain a cellulose having an average degree of polymerization of 30 to 375, then attriting the cellulose by applying a mechanical shear (a shear force) to make it into fine cellulose, adding thereto a low-viscosity water-soluble dietary fiber and mixing them, and drying the resulting mixture. It is particularly preferred to add a low-viscosity water-soluble dietary fiber to the depolymerized cellulose material, then conducting attrition and mixing simultaneously by applying a mechanical shear (this is wet co-attrition), and drying the resulting material to make a fine cellulose-containing composite. The present cellulose-containing composite may also be obtained by subjecting a cellulose material (e.g. wood pulp or bacterial cellulose) to a weak chemical treatment (not an ordinary chemical treatment), then conducting wet attrition or pulverizing by applying a mechanical shear to obtain a fine fibrous cellulose or a powdery cellulose, adding thereto a low-viscosity water-soluble dietary fiber, mixing and/or attriting them in the presence of water, and drying the resulting material to make a fine cellulose-containing composite.

The attritor used for wet attrition is appropriately selected depending upon the amount of water present in the attrition system and the intended degree of cellulose fineness achieved by attrition.

For example, when a sufficient mechanical shear is applied so as to obtain a fine cellulose having an average particle size of 8 $\mu$m or less, a media agitating mill can be used (e.g. wet vibration mill, wet planetary vibration mill, wet ball mill, wet roll mill, wet coball mill or wet beads mill), a wet paint shaker, a high-pressure homogenizer, or the like. Effective as the high-pressure homogenizer is a type wherein a slurry is introduced into a small diameter orifice at a pressure of about 500 kgf/cm$^2$ or more and face-to-face collision is allowed to take place at a high flow speed. When the above mill is used, the optimum solid concentration in slurry differs depending upon the kind of mill, but is appropriately about 3 to 25% by weight.

When a mechanical shear is applied so as to obtain a fine cellulose having an average particle size of 5 to 30 $\mu$m, and when a slurry having a solid content of about 3 to 30% by weight is attrited, an attritor or a mixer can be used such as colloid mill, continuous ball mill, homogenizer, homomixer, propeller mixer or the like. When a cake having a higher solid content of about 20 to 50% by weight is attrited, there can be used a kneader, an automated mortar, an extruder or the like. A microfibrillated cellulose can be obtained by passing a suspension of a cellulose material through a high-pressure homogenizer several times at a pressure of 50 kgf/cm$^2$ or more to decrease the fiber diameter to about 0.01 to 1 µm, or by treating a suspension of a cellulose material in a media agitating mill several times. These apparatuses can be used singly or in combination of two or more to achieve the object of the present invention.

The drying of the mixture of a fine cellulose and a low-viscosity water-soluble dietary fiber can be conducted by a known method. However, in practicing the drying, an optimum method should be selected depending upon the water content in the mixture to be dried and the state of the mixture. In drying a slurry mixture, for example, there can be used spray drying, drum drying, alcohol precipitation, etc. In drying a muddy mixture or a rice cake-like mixture, there can be used tray drying, belt drying, fluidized bed drying, freeze-drying, microwave drying, etc. In order to obtain a composite which is improved in solubility and redispersibility in water, it is preferred to spray-dry a slurry mixture. In order to reduce the drying cost, alcohol precipitation, pressing, tray drying which is capable of drying a mixture of high solid content, and fluidized bed drying methods are preferred. The upper limit of water content in the dried mixture is preferably 15% by weight or less, particularly preferably 10% by weight or less, more preferably 6% by weight or less in view of the handleability (easiness of handling) and storage stability of the dried mixture.

The dried mixture obtained by drum drying, tray drying, belt drying or the like has a thin sheet shape or a lump shape. Therefore, it is preferable that the dried material is pulverized by an appropriate method such as impact type pulverizer, jet mill or the like and powderized to such a degree that almost all the powder can pass through a screen having an opening of 425 µm.

The cellulose-containing composite of the present invention can be used in various foods. Examples of such foods are drinks such as favorite drinks (e.g. coffee, black tea, powdered tea, cocoa, adzuki-bean soup with rice cake and juice), milk-based drinks (e.g. raw milk, processed milk, lactobacillus drink and soy-milk), nutrient-fortified drinks (e.g. calcium-fortified drink), dietary fiber-containing drinks and the like; ice, such as ice cream, iced milk, soft cream, milk shake, sherbet and the like; milk products such as butter, cheese, yogurt, coffee whitener, whipping cream, custard cream, pudding and the like; processed oil and fat foods such as mayonnaise, margarine, spread, shortening and the like; condiments such as soups, stew, sauce, dripping, dressing and the like; gel- or paste-like foods such as spice pastes (e.g. mustard paste), jam, fillings (e.g. flour paste), bean jams, jelly and the like; cereal foods such as bread, noodle, pasta, pizza, premixes and the like; Japanese-style and western-style cakes such as candy, cookie, biscuit, hot cake, chocolate, rice cake and the like; marine paste products such as boiled fish paste, fish cake and the like; livestock products such as ham, sausage, hamburger and the like; side dishes taken with cooked rice or bread, such as cream croquette, bean jams for Chinese foods, gratin, dumpling stuffed with minced pork, and the like; delicacies such as salted fish guts, vegetables pickled with sake lees, and the like; liquid diets such as tube fed liquid diet, and the like; and pet foods, and the like.

In these applications, the cellulose-containing composite of the present invention acts as a suspension stabilizer, an emulsion stabilizer, a thickener and stabilizer, a foam stabilizer, a cloudiness agent, a texture-imparting agent, a fluidity improver, a shape-retaining agent, a water separation-preventing agent, a body-modifying agent, a powderizing agent, a dietary fiber agent, a low calorie agent for oil and fat replacement, etc. The effects of the present invention can be exhibited even when the above foods vary in shape or cooking method as seen in retort foods, powder foods, frozen foods and foods for electronic oven.

Since the present cellulose-containing composite gives a low viscosity and contains a fine cellulose of small particles, it is characterized in that the food produced with the composite is plain to the tongue, passes through the throat comfortably, is low in roughness to the tongue and, therefore, gives good feeling when taken into the mouth.

The present cellulose-containing composite is suitable particularly as a dietary fiber material for tube fed liquid diet. Currently, in the art of tube fed liquid diets, it is being attempted to use both a water-soluble dietary fiber and a water-insoluble dietary fiber. Some tube fed liquid diets of this kind are already being marketed but they do not have such sufficient properties as described below. A tube fed liquid diet is administered to human body through a tube and must flow down through the tube at a fairly low speed at a constant speed over a long period of time. In the above commercial products, however, there are cases that the water-insoluble component clogs the clamp of the tube (the clamp controls the speed of flowing down). Currently, the tubal liquid food is administered by opening the clamp as necessary to eliminate the clogging. The present cellulose-containing composite gives a low viscosity and the particles of the fine cellulose hardly give rise to flocculation. Therefore, when the present composite is used in a tube fed liquid diet, there occurs substantially no clogging at the clamp of the tube. Moreover, since the present composite contains a water-soluble dietary fiber and a water-insoluble dietary fiber, the present composite is highly excellent as a dietary fiber material for tube fed liquid diet.

When the cellulose-containing composite of the present invention is used in a food, the main materials of the food and, as necessary, a spice, a pH-controlling agent, a thickener and stabilizer, a salt, a saccharide, an oil or fat, a protein, an emulsifier, an acidulant, a food color, etc., they are subjected to mixing, kneading, stirring, emulsification, heating, etc. by using the same apparatus(es) as ordinarily used in the production of various foods.

The content of the present cellulose-containing composite in food varies depending upon the kind of food, etc. but is preferably about 0.01 to 15% by weight based on the total weight of the food. The content is preferably about 0.02 to 3% by weight when the present composite is intended to be used mainly as a stabilizer. The content is preferably about 0.5 to 15% by weight when the present composite is intended to be used mainly as a dietary fiber material (for tube fed liquid diet, etc.) or as a material for oil and fat replacement.

Next, the present invention is described in detail below by way of Examples.

The measurements were made as follows.

Average Particle Size and Proportion of Particles of 10 µm or more in the composite (1) Distilled water is added to 3.0 g (as solid content) of a sample to make the total amount 300 g.

(2) The mixture is dispersed at 15,000 rpm for 5 minutes using Ace Homogenizer AM-T (a product of NIPPON SEIKI CO., LTD.).

(3) The resulting dispersion is measured for particle size distribution using a laser diffraction type particle size distribution measuring apparatus (LA-910, a product of HORIBA SEISAKUSHO CO., Ltd.). "Average particle size" is the particle size of 50% cumulative volume, and "proportion of particles having particle sizes of 10 $\mu$m or more" is the proportion (%) in volume distribution.

Viscosity of Composite (1) Distilled water is added to 9.0 g (as solid content) of a sample to make the total amount 300 g.

(2) The mixture is dispersed at 15,000 rpm for 5 minutes using Ace Homogenizer AM-T (a product of NIPPON SEIKI CO., LTD.).

(3) The resulting dispersion is measured for viscosity, using a BL type viscometer (a product of Tokyo Keiki) at 60 rpm (rotor) at 25° C. (dispersion temperature). The unit of viscosity is mpas.

Colloidal Content of Composite (1) Distilled water is added to 0.75 g (as solid content) of a sample to make the total amount 300 (2) The mixture is dispersed at 15,000 rpm for 2 minutes using Ace Homogenizer AM-T (a product of NIPPON SEIKI CO., LTD.).

(3) 10 ml of the resulting dispersion is accurately taken in a weighing bottle and accurately weighed.

(4) 40 ml of the remaining dispersion is transferred into a centrifuge tube and is subjected to centrifugation at 2,000 rpm for 15 minutes using H-300 (a centrifuge produced by Kokusan Enshinki). 10 ml of the upper liquid is accurately taken in a weighing bottle and accurately weighed.

(5) The weighing bottles of (3) and (4) are heated in a dryer of 105° C. for 10 hours to subject the contents to evaporation to dryness.

(6) The solid content of (3) is accurately weighed and taken as A g.

(7) The solid content of (4) is accurately weighed and taken as B g.

(8) A correction is made for water-soluble components (the proportion (S%) of the low-viscosity water-soluble dietary fibers and other water-soluble substances contained in composite of the total), and the colloidal content is calculated using the following formula.

Colloidal content (%)=[($B-A \times S/100)/(A \times (1 \times S/100))] \times 100$

EXAMPLE 1

A commercial DP pulp was hydrolyzed in 7% hydrochloric acid at 105° C. for 20 minutes. The resulting acid-insoluble residue was collected by filtration, and washed to obtain a wet cake (solid content: 40%) of hydrolyzed cellulose having a degree of polymerization of 195.

This hydrolyzed cellulose and an enzymatically hydrolyzed guar gum (Sunfiber (trade name), a product of Taiyo Kagaku Co., Ltd. having a viscosity of 7 mPa·s when measured at its 10% aqueous solution at 60 rpm (rotor) using a BL type viscometer and a BL adapter) were subjected to attrition and kneading at the ratio (in solid content) shown in Table 1, for 3 hours using a kneader. The kneaded material was dried in a hot air dryer of 60° C. and then pulverized to obtain cellulose-containing composites A to D. Each composite was dispersed in water and the aqueous dispersion was measured for average particle size, proportion of particles of 10 $\mu$m or more, colloidal content and viscosity. The results are shown in Table 1. When the aqueous dispersion after the viscosity measurement was allowed to stand at room temperature for 3 days, there was no water separation at the top and each dispersion was stable.

EXAMPLE 2

The same operation as in Example 1 was conducted to obtain a wet cake of hydrolyzed cellulose. Water was added thereto to prepare a cellulose dispersion having a solid content of 10%.

The cellulose dispersion was subjected to a pulverizing treatment by passing it twice through a media agitation wet grinder (APEX MILL AM-1 (trade name), a product of Kotobuki Engineering and Manufacturing Co., Ltd.) using, as the media, zirconia beads of 1 mm in diameter under the conditions of 1,800 rpm (blade) and 0.4-liter/min (feed rate of cellulose dispersion), whereby a paste of fine cellulose was obtained. The fine cellulose had an average particle size of 3.4 $\mu$m and a proportion of particles of 10 $\mu$m or more, of 4.5%.

The fine cellulose and the same enzymatically hydrolyzed guar gum as in Example 1 were mixed at a ratio (in solid content) of 70/30 with stirring, to prepare a dispersion having a total solid content of 13%. Then, the dispersion was casted on an aluminum plate and dried in a hot air dryer at 60° C. Thereafter, the dried material on the aluminum plate was pulverized using a hammer mill to obtain a cellulose-containing composite E. The composite E was redispersed in water and the aqueous dispersion was measured for average particle size, proportion of particles of 10 $\mu$m or more, colloidal content and viscosity. The results are shown in Table 1. When the aqueous dispersion after the viscosity measurement was allowed to stand at room temperature for 3 days, there was no water separation at the top and the dispersion was stable.

EXAMPLE 3

The same operation as in Example 1 was conducted to obtain a wet cake of hydrolyzed cellulose. Thereto were added the same enzymatically hydrolyzed guar gum as in Example 1 and water to prepare a dispersion having a fine cellulose/enzymatically hydrolyzed guar gum ratio of 70/30 and a solid content of 16%. The dispersion was treated at 8,000 rpm for 15 minutes using TK Homomixer (a product of Tokushu Kika Kogyo K.K.) and then spray-dried to obtain a cellulose-containing composite F. The composite F was redispersed in water and the aqueous dispersion was measured for average particle size, proportion of particles of 10 $\mu$m or more and viscosity. The results are shown in Table 1. When the aqueous dispersion after the viscosity measurement was allowed to stand at room temperature for 3 days, there was no water separation at the top and the dispersion was stable.

EXAMPLE 4

The same operation as in Example 1 was conducted to obtain a wet cake of hydrolyzed cellulose. This hydrolyzed cellulose, the same emzymatically hydrolyzed guar gum as in Example 1, xanthan gum (a product of San-Ei Gen F.F.I., Inc.) and gellan gum (Kelcogel LT-100 (trade name), a product of San-Ei Gen F.F.I., Inc.) were mixed at a ratio (in solid content) shown in Table 1. The resulting mixture was subjected to the same kneading, drying and pulverizing as in Example 1, to obtain cellulose-containing composites G and H. The composites G and H were redispersed in water and each aqueous dispersion was measured for average particle size, proportion of particles of 10 μm or more, colloidal content and viscosity. The results are shown in Table 1. When the aqueous dispersion after the viscosity measurement was allowed to stand at room temperature for 3 days, there was no water separation at the top and each dispersion was stable.

EXAMPLE 5

A powdered cellulose (KC Flok (trade name), a product of Nippon Paper Industries Co., Ltd.) and the same enzymatically hydrolyzed guar gum as in Example 1 were mixed at a ratio (in solid content) shown in Table 1. Thereto was added water in an amount of 1.5 times that of the powdered cellulose. The resulting mixture was subjected to the same kneading, drying and pulverizing as in Example 1 to obtain a cellulose-containing composite I. The composite I was redispersed in water and the aqueous dispersion was measured for average particle size, proportion of particles of 10 μm or more and viscosity. The results are shown in Table 1. When the aqueous dispersion after the viscosity measurement was allowed to stand at room temperature for 3 days, there was no water separation at the top and the dispersion was stable.

Comparative Example 1

The same operation as in Example 1 was conducted for the compositions shown in Table 1, to obtain cellulose particles a, and a composite b. The resulting cellulose particles and composite were redispersed in water and the aqueous dispersion was measured for average particle size, proportion of particles of 10 μm or more, colloidal content and viscosity. The results are shown in Table 1. When the aqueous dispersion after the viscosity measurement was allowed to stand at room temperature for 3 days, water separation took place in the aqueous dispersion of the cellulose particles a, at the top 95% portion and, in the aqueous dispersion of the composite b, at the top 32% portion.

EXAMPLE 6

A commercial DP pulp was hydrolyzed in 7% hydrochloric acid at 105° C. for 20 minutes. The resulting acid-insoluble residue was collected by filtration and washed to obtain a wet cake (solid content: 41%) of hydrolyzed cellulose. This hydrolyzed cellulose and an indigestible dextrin (Pine Fiber (trade name), a product of Matsutani Kagaku Kogyo K.K. having a viscosity of 2 mPa·s when measured for its 10% aqueous solution at 60 rpm (rotor) using a BL type viscometer and a BL adapter) were subjected to attrition and kneading at the ratio (in solid content) shown in Table 2, for 3 hours using a kneader. The kneaded material was dried in a hot air dryer at 60° C. and then pulverized to obtain cellulose-containing composites J to L. Each composite was redispersed in water and the aqueous dispersion was measured for average particle size, proportion of particles of 10 μm or more, colloidal content and viscosity. The results are shown in Table 2. When the aqueous dispersion after the viscosity measurement was allowed to stand at room temperature for 3 days, there was no water separation at the top and each dispersion was stable.

EXAMPLE 7

The same operation as in Example 6 was conducted to obtain a wet cake of hydrolyzed cellulose. Thereto was added water to obtain a cellulose dispersion having a solid content of 10%. This cellulose dispersion was subjected to the same operation as in Example 2 to obtain a paste of fine cellulose wherein the average particle size of fine cellulose was 3.5 μm and the proportion of particles of 10 μm or more was 4.7%. The fine cellulose paste and the same indigestible dextrin as in Example 6 were mixed at a ratio (in solid content) of 60/40 with stirring, to prepare a dispersion having a total solid content of 13%. Then, the dispersion was casted on an aluminum plate and dried in a hot air dryer at 60° C. Thereafter, the dried material on the aluminum plate was pulverized using a hammer mill to obtain a cellulose-containing composite M. The composite M was redispersed in water and the aqueous dispersion was measured for average particle size, proportion of particles of 10 μm or more, colloidal content and viscosity. The results are shown in Table 2. When the aqueous dispersion after the viscosity measurement was allowed to stand at room temperature for 3 days, there was no water separation at the top and the dispersion was stable.

EXAMPLE 8

The same operation as in Example 6 was conducted to obtain a wet cake of hydrolyzed cellulose. Thereto were added the same indigestible dextrin as in Example 6 and water to prepare a dispersion having a fine cellulose/indigestible dextrin ratio of 85/15 and a solid content of 16%. The dispersion was treated at 8,000 rpm for 15 minutes using TK Homomixer (a product of Tokushu Kika Kogyo K.K.) and then spray-dried to obtain a cellulose-containing composite N. The composite N was redispersed in water and the aqueous dispersion was measured for average particle size, proportion of particles of 10 μm or more and viscosity. The results are shown in Table 2. When the aqueous dispersion after the viscosity measurement was allowed to stand at room temperature for 3 days, there was no water separation at the top and the dispersion was stable.

EXAMPLE 9

The same operation as in Example 6 was conducted to obtain a wet cake of hydrolyzed cellulose. The hydrolyzed cellulose, the same indigestible dextrin as in Example 6, xanthan gum (a product of San-Ei Gen F.F.I., Inc.) and gellan gum (Kelcogel LT-100 (trade name), a product of San-Ei Gen F.F.I., Inc.) were mixed at a ratio (in solid content) shown in Table 2. The resulting mixture was subjected to the same kneading, drying and pulverizing as in Example 6, to obtain cellulose-containing composites O and P. The composites O and P were redispersed in water and each aqueous dispersion was measured for average particle size, proportion of particles of 10 μm or more, colloidal content and viscosity. The results are shown in Table 2. When the aqueous dispersion after the viscosity measurement was allowed to stand at room temperature for 3 days, there was no water separation at the top and each dispersion was stable.

EXAMPLE 10

A powdered cellulose (KC Flok (trade name), a product of Nippon Paper Industries Co., Ltd.) and the same indigestible dextrin as in Example 6 were mixed at a ratio (in solid content) shown in Table 2. Thereto was added water in an amount of 1.5 times that of the powdered cellulose. The resulting mixture was subjected to the same kneading, drying and pulverizing as in Example 6 to obtain a cellulose-containing composite Q. The composite Q was redispersed in water and the aqueous dispersion was measured for average particle size, proportion of particles of 10 μm or more and viscosity. The results are shown in Table 2. When the aqueous dispersion after the viscosity measurement was allowed to stand at room temperature for 3 days, there was no water separation at the top and the dispersion was stable.

Comparative Example 2

The same operation as in Example 6 was conducted for the compositions shown in Table 2, to obtain a composite c. The composite was redispersed in water and the aqueous dispersion was measured for average particle size, proportion of particles of 10 μm or more and viscosity. The results are shown in Table 2.

Comparative Example 3

The cellulose particles a and the same indigestible dextrin as in Example 6 were mixed to obtain a powder d. The powder d was redispersed in water and the aqueous dispersion was measured for average particle size, proportion of particles of 10 μm or more and viscosity. The results are shown in Table 2. When the aqueous dispersion after the viscosity measurement was allowed to stand at room temperature for 3 days, water separation took place at the top 94% portion.

EXAMPLE 11

The same operation as in Example 6 was conducted to obtain a wet cake of hydrolyzed cellulose. The hydrolyzed cellulose, a polydextrose (Litesse (trade name) a product of Cultor Food Science Co., Ltd.), and xanthan gum (same as in Example 9) alone or gellan gum (same as in Example 9) alone or a mixture of xanthan gum and gellan gum were mixed at a ratio (in solid content) shown in Table 3. The resulting mixture was subjected to the same kneading, drying and pulverizing as in Example 6, to obtain cellulose-containing composites R to U. The composites R to U were redispersed in water and each aqueous dispersion was measured for average particle size, proportion of particles of 10 μm or more, colloidal content and viscosity. The results are shown in Table 3. When the aqueous dispersion after the viscosity measurement was allowed to stand at room temperature for 3 days, there was no water separation at the top and each dispersion was stable.

Comparative Example 4

The same operation as in Example 6 was conducted for the compositions shown in Table 3, to obtain composites e and f. Each composite was redispersed in water and the aqueous dispersion was measured for average particle size, proportion of particles of 10 μm or more, viscosity and colloidal content. The results are shown in Table 3.

Comparative Example 5

The same operation as in Example 6 was conducted to obtain a wet cake of hydrolyzed cellulose. Thereto was added water to obtain a cellulose dispersion having a solid content of 10%. The cellulose dispersion was subjected to the same operation as in Example 2 to obtain a paste of fine cellulose wherein the average particle size of fine cellulose was 3.5 μm, the proportion of particles of 10 μm or more was 4.7% and the colloidal content was 69%. The fine cellulose paste, the same polydextrose as in Example 11 and the same xanthan gum as in Example 9 were mixed at a ratio (in solid content) of 75/20/5 with stirring, to prepare a dispersion having a total solid content of 3.5%. The dispersion was spray-dried to obtain a composite g. The composite g was redispersed in water and the aqueous dispersion was measured for average particle size, proportion of particles of 10 μm or more, colloidal content and viscosity. The results are shown in Table 3. Incidentally, the composite g belongs to the technique disclosed in JP-A-7-268129. As is clear from Table 3, the aqueous dispersion of the composite g has a high colloidal content of 95% and accordingly a high viscosity of 410 mpa·s.

Comparative Example 6

A paste of fine cellulose, obtained in the same manner as in Comparative Example 5, the same polydextrose as in Example 11 and water were mixed to prepare a dispersion having a fine cellulose/polydextrose ratio (in solid content) of 70/30 and a total solid content of 12%. The dispersion was dried using a drum drier. The resulting film was pulverized to obtain a composite h. The composite h was redispersed in water and the aqueous dispersion was measured for average particle size, proportion of particles of 10 μm or more, colloidal content and viscosity. The results are shown in Table 3. When the aqueous dispersion after the viscosity measurement was allowed to stand at room temperature for 3 days, a transparent layer of separated water appeared at the top 11% portion. Incidentally, the composite h is disclosed in JP-A-7-70635.

EXAMPLE 12

A commercial DP pulp was hydrolyzed in 10% hydrochloric acid at 105° C. for 30 minutes. The resulting acid-insoluble residue was collected by filtration and washed to obtain a wet cake (solid content: 48%) of hydrolyzed cellulose having a degree of polymerization of 185.

The hydrolyzed cellulose, the same enzymatically hydrolyzed guar gum as in Example 1, an indigestible dextrin (Fibersol 2 (trade name), a product of Matsutani Kagaku Kogyo K.K. having a viscosity of 2 mPa·s when measured for its 10% aqueous solution at 60 rpm (rotor) using a BL type viscometer and a BL adapter), the same polydextrose as in Example 11, the same xanthan gum as in Example 9 and the same gellan gum as in Example 9 were subjected to attrition and kneading at the ratio (in solid content) shown in Table 4, for 3 hours using a kneader. The kneaded material was dried in a hot air dryer at 60° C. and then pulverized to obtain cellulose-containing composites V to X. Each composite was dispersed in water and the aqueous dispersion was measured for average particle size, proportion of particles of 10 μm or more and viscosity. The results are shown in Table 4. When the aqueous dispersion after the viscosity measurement was allowed to stand at room temperature for 3 days, there was no water separation at the top and each dispersion was stable.

EXAMPLE 13

Using cellulose-containing composites for the purposes of suspension stabilization, dietary fiber fortification, etc., nutrient-fortified drinks were produced.

There were dispersed, at 10,000 rpm for 10 minutes using TK Homomixer, 1.0% by weight of the cellulose-containing composite A, C, G, L, M, P, R, T or X, 3.3% by weight of sodium caseinate, 11.0% by weight of hydrolyzed starch, 1.4% by weight of sugar, 0.8% by weight of lactose, 1.1% by weight of soybean lecithin, 1.0% by weight of a medium chain fatty acid ester, 1.0% by weight of a salad oil and 79.4% by weight of water. The resulting material was passed once through a high-pressure homogenizer at a pressure of 150 kgf/cm² to give rise to homogenization. The resulting material was filled in a heat resisting bottle and sterilized at 121° C. for 30 minutes in an autoclave to obtain nutrient-fortified drinks.

Each drink was examined for viscosity (measured at 60 rpm (rotor) using a B type viscometer), precipitate formation and rough feeling to tongue when taken into mouth. The results are shown in Table 5.

Comparative Example 7

Nutrient-fortified drinks were obtained in the same operation as in Example 13 except that the composite a, g or h was used. Each drink was examined for viscosity (measured at 60 rpm (rotor) using a B type viscometer), precipitate formation and rough feeling to tongue when taken into mouth. The results are shown in Table 5. The drink using the composite g showed no precipitate and no rough feeling to tongue, but was very viscous and felt like a paste.

EXAMPLE 14

Using cellulose-containing composites for the purposes of, for example, imparting shape retainability or fortifying a dietary fiber, biscuits were produced.

There were mixed, in a powder state, 30 parts by weight of the cellulose-containing composite A, G, M, P, R, T or X, 300 parts by weight of wheat flour, 100 parts by weight of sugar, 6 parts by weight of sodium bicarbonate and 3 parts by weight of table salt. The mixture was placed in a planetary mixer. Thereto were added 150 parts by weight of margarine, 30 parts by weight of whole egg (white and yolk) and water, followed by kneading for 5 minutes. Water was added in an amount shown in Table 6. During the kneading, adhesion of dough to the inner wall of the planetary mixer was observed. The kneaded dough was placed in a refrigerator for one night, then returned to room temperature, and molded into a shape of 15 mm (thickness) ×30 mm (width) ×15 mm. The molding was baked in an oven at 160° C. for 20 minutes to obtain various biscuits. Each biscuit was observed for shape retainability (sagging) after baking. The biscuit after baking was examined for feeling when taken into mouth. The results are shown in Table 6.

Comparative Example 8

Biscuits were produced in the same operation as in Example 14 except that the composite a, c or e was used. There were observed the adhesion of dough to the inner wall of planetary mixer during kneading and the shape retainability (sagging) of biscuit after baking. The feeling of biscuit when taken into mouth was examined. The results are shown in Table 6.

EXAMPLE 15

Using cellulose-containing composites as a replacement for oil and fat, an emulsion stabilizer, etc., low-fat mayonnaise-like dressings were produced.

8.0% by weight of the cellulose-containing composite E, P or T and 37.7% by weight of water were placed in a Hobart mixer and dispersed with stirring. Thereto were added, with stirring, 0.3% by weight of xanthan gum and 10.0% by weight of egg yolk. Further, 33.0% by weight of a salad oil was added with stirring. Stirring was continued. Successively, there were added 7.0% by weight of vinegar, 2.6% by weight of table salt, 0.9% by weight of sugar, 0.4% by weight of a mustard powder and 0.1% by weight of sodium glutamate. The mixture was stirred for about 30 minutes and then passed through a colloid mill for emulsification, to produce dressings.

Each dressing was examined for feeling (smoothness, roughness and body) when taken into mouth and thermal stability (emulsion stability when the dressing was placed in a glass bottle and the bottle was immersed in hot water at 95° C. for 15 minutes). The results are shown in Table 7.

Comparative Example 9

Dressings were produced by the same operation as in Example 15 except that the composite b, e or g was used. Each dressing was examined for feeling when taken into mouth and thermal stability. The results are shown in Table 7.

EXAMPLE 16

Using cellulose-containing composites for the purposes of dietary fiber fortification, etc., tube fed liquid diets were produced.

There were mixed 1.5% by weight of the cellulose-containing composite C, P or R, 14.2% by weight of hydrolyzed starch, 3.1% by weight of casein, 2.1% by weight of powdered skim milk, 1.0% by weight of corn oil, 1.0% by weight of coconut oil, 0.09% by weight of potassium chloride, 0.05% by weight of sodium chloride, 0.05% by weight of magnesium sulfate, 0.02% by weight of calcium glycerophosphate, 0.02% by weight of soybean lecithin, 63 ppm of vitamin C, 20 ppm of vitamin E, 9 ppm of nicotamide and 0.7 ppm of vitamin B1 hydrochloride. Thereto was added 76.87% by weight of hot water having a temperature of 60° C. The mixture was dispersed at 10,000 rpm for 5 minutes using TK Homomixer. The resulting material was passed once through a high-pressure homogenizer at a pressure of 150 kgf/cm² for emulsification. The resulting material was filled in a heat resistant bottle and sterilized at 121° C. for 30 minutes in an autoclave, to obtain tube fed liquid diets.

To the tip of a tube (inner diameter: 3.4 mm, length: 120 cm) fitted to a polyvinyl chloride-made bag for nutrient feeding was connected an EVA-made tube (inner diameter: 0.88 mm, length: 120 cm) for nutrient feeding. Then, one liter of the tube fed liquid diet obtained above was filled in the bag for nutrient feeding. By throttling a clamp, the flowing-down speed of the tube fed liquid diet was controlled to 170 g/hr, and the tube fed liquid diet was allowed to flow down from a height of 1.2 m. The tube fed liquid diet was measured for appearance when filled in the bag, clogging during flowing down, change of flowing speed, etc. The results are shown in Table 8.

Comparative Example 10

Tube fed liquid diets were produced by the same operation as in Example 16 except that the composite b, d, g or h was used. Each tube fed liquid diet was examined in the same manner as in Example 16. The results are shown in Table 8.

TABLE 1

| | Composite | Composition (wt. %) | | | | Aqueous dispersion of Composite | | | |
| | | Fine cellulose | Enzymatically hydrolyzed guar gum | Xanthan gum | Gellan gum | Average particle size (μm) | Particles of 10 μm or more (%) | Colloidal content (%) | Viscosity (mPa·s) |
|---|---|---|---|---|---|---|---|---|---|
| Example 1 | A | 40 | 60 | 0 | 0 | 7.4 | 35 | 18 | 8 |
| | B | 60 | 40 | 0 | 0 | 8.2 | 42 | — | 10 |
| | C | 75 | 25 | 0 | 0 | 8.0 | 38 | 21 | 12 |
| | D | 90 | 10 | 0 | 0 | 11.0 | 56 | — | 12 |
| Example 2 | E | 70 | 30 | 0 | 0 | 3.6 | 7.5 | 83 | 40 |
| Example 3 | F | 70 | 30 | 0 | 0 | 18.2 | 64 | — | 60 |
| Example 4 | G | 70 | 28 | 2 | 0 | 8.4 | 42 | 70 | 80 |
| | H | 70 | 29 | 0 | 1 | 8.6 | 39 | — | 86 |
| Example 5 | I | 70 | 30 | 0 | 0 | 15.4 | 58 | — | 20 |
| Comparative Example 1 | a | 100 | 0 | 0 | 0 | 42.0 | 86 | 0 | 10 |
| | b | 10 | 90 | 0 | 0 | 7.6 | 38 | 5 | 8 |

TABLE 2

| | Composite | Composition (wt. %) | | | | Aqueous dispersion of Composite | | | |
| | | Fine cellulose | Indigestible dextrin | Xanthan gum | Gellan gum | Average particle size (μm) | Particles of 10 μm or more (%) | Colloidal content (%) | Viscosity (mPa·s) |
|---|---|---|---|---|---|---|---|---|---|
| Example 6 | J | 45 | 55 | 0 | 0 | 7.1 | 25 | — | 4.0 |
| | K | 70 | 30 | 0 | 0 | 8.5 | 38 | — | 5.4 |
| | L | 85 | 15 | 0 | 0 | 11.2 | 55 | 32 | 9.5 |
| Example 7 | M | 60 | 40 | 0 | 0 | 4.5 | 7 | 56 | 7.6 |
| Example 8 | N | 85 | 15 | 0 | 0 | 14.8 | 67 | — | 45 |
| Example 9 | O | 74 | 25 | 1 | 0 | 6.9 | 26 | — | 40 |
| | P | 74.7 | 25 | 0 | 0.3 | 7.3 | 29 | 42 | 30 |
| Example 10 | Q | 60 | 40 | 0 | 0 | 21.3 | 82 | — | 16 |
| Comparative Example 2 | c | 10 | 90 | 0 | 0 | 6.3 | 21 | 3 | 7.0 |
| Comparative Example 3 | d | 70 | 30 | 0 | 0 | 41.0 | 83 | 0 | 6.3 |

TABLE 3

| | Composite | Composition (wt. %) | | | | Aqueous dispersion of Composite | | | |
| | | Fine cellulose | Polydextrose | Xanthan gum | Gellan gum | Average particle size (μm) | Particles of 10 μm or more (%) | Colloidal content (%) | Viscosity (mPa·s) |
|---|---|---|---|---|---|---|---|---|---|
| Example 11 | R | 60 | 38.5 | 1.5 | 0 | 6.5 | 21 | 26 | 27 |
| | S | 50 | 49.5 | 0 | 0.5 | 6.2 | 19 | 40 | 33 |
| | T | 40 | 59.2 | 0.5 | 0.3 | 8.5 | 38 | 63 | 47 |
| | U | 75 | 23.5 | 1.5 | 0 | 7.5 | 32 | 32 | 39 |
| Comparative Example 4 | e | 10 | 90 | 0 | 0 | 6.4 | 21 | 12 | 7.2 |
| | f | 70 | 30 | 0 | 0 | 8.2 | 37 | 14 | 5.5 |
| Comparative Example 5 | g | 75 | 20 | 5 | 0 | 3.7 | 2.5 | 95 | 410 |
| Comparative Example 6 | h | 70 | 30 | 0 | 0 | 4.0 | 10 | 81 | 60 |

TABLE 4

| Compos-ite | Composition (wt. %) | | | | | | Aqueous composition of composite | | | |
|---|---|---|---|---|---|---|---|---|---|---|
| | FC | GU | ND | PD | XA | GE | Average particle size (μm) | Particles of 10 μm or more (%) | Colloidal content (%) | Viscosity (mPa · s) |
| Example 12 V | 80 | 10 | 10 | 0 | 0 | 0 | 9.5 | 42 | — | 8 |
| W | 70 | 10 | 18 | 0 | 2 | 0 | 8.2 | 35 | — | 15 |
| X | 60 | 0 | 30 | 8.5 | 0 | 1 | 9.6 | 46 | 35 | 16 |

FC: fine cellulose
GU: hydrolyzed guar gum
ND: indigestible dextrin
PD: polydextrose
XA: xanthan gum
GE: gellan gum

TABLE 5

| | Composite | Viscosity (mPa · s) | Roughness to tongue | Precipitate |
|---|---|---|---|---|
| Example 13 | A | 24 | No | No |
| | C | 24 | No | No |
| | G | 210 | No | No |
| | L | 32 | No | No |
| | M | 22 | No | No |
| | P | 120 | No | No |
| | R | 95 | No | No |
| | T | 170 | No | No |
| | X | 51 | No | No |
| Comparative Example 7 | a | 32 | Yes | Yes |
| | g | 1560 | No | No |
| | h | 250 | No | Yes |

TABLE 6

| | Composite | Amount of water added (parts by weight) | Adhesion during kneading | Shape retain-ability after baking | Feeling in mouth |
|---|---|---|---|---|---|
| Example 14 | A | 40 | No | Good | Good |
| | G | 50 | No | Good | Good |
| | M | 50 | No | Good | Good |
| | P | 55 | No | Good | Good |
| | R | 50 | No | Good | Good |
| | T | 45 | No | Good | Good |
| | X | 50 | No | Good | Good |
| Comparative Example 8 | a | 60 | No | Good | Rough to tongue |
| | c | 30 | Yes | Shape was lost. | Poor melting in mouth |
| | e | 30 | Yes | Shape was lost. | Poor melting in mouth |

TABLE 7

| | Com-posite | Feeling in mouth | | | Thermal stability |
|---|---|---|---|---|---|
| | | Smooth-ness | Rough-ness | Body | |
| Example 15 | E | Good | No | Good | No separation of water or oil |
| | P | Good | No | Good | No separation of water or oil |
| | T | Good | No | Good | No separation of water or oil |

TABLE 7-continued

| | Com-posite | Feeling in mouth | | | Thermal stability |
|---|---|---|---|---|---|
| | | Smooth-ness | Rough-ness | Body | |
| Comparative Example 9 | b | Good | No | Insuf-ficient | Slight separation of both water and oil |
| | e | Good | Yes | Insuf-ficient | Slight separation of both water and oil |
| | g | Good | Yes | Exces-sive | No separation of water or oil |

TABLE 8

| | Com-posite | Appearance | Flowing-down property |
|---|---|---|---|
| Example 16 | C | Good | Slight clogging took place twice. Clogging was eliminated by opening the clamp, and the whole volume flowed down. |
| | P | Good | The whole volume flowed down with no clogging. |
| | R | Good | The whole volume flowed down with no clogging. |
| Comparative Example 10 | b | A white precipitate layer appeared at the bottom 6% portion. | Owing to severe clog-ging, flowing-down at a constant speed was impossible. |
| | d | A white precipitate layer appeared at the bottom 4% portion. | Owing to severe clog-ging, flowing-down at a constant speed was impossible. |
| | g | Good | The high viscosity made it impossible to achieve a desired flow speed even by full opening of the clamp. |
| | h | Flocculation took place in the whole portion. | Complete clogging tack place 6 times. |

Industrial Applicability

The cellulose-containing composite of the present invention comprises a particular fine cellulose, a hydrolyzed galactomannan, an indigestible dextrin, a polydextrose and a stabilizer (e.g. xanthan gum and gellan gum) at particular proportions. Therefore, when dispersed in water, the present composite gives a low viscosity and excellent suspension stability. Accordingly, the food containing the present composite is superior in feeling when taken into mouth, has superior shape retainability, flowing-down property when used as tube fed liquid diet, etc., and moreover has very high effects as a dietary fiber material, a replacement for oil and fat, etc.

What is claimed is:

1. A cellulose-containing composite comprising 20–99% by weight of a fine cellulose and 1–80% by weight of at least one low-viscosity water-soluble dietary fiber selected from the group consisting of 1) a hydrolyzed galactomannan, and 2) an indigestible dextrin, in which composite the average particle size of the fine cellulose is 30 μm or less when the composite is dispersed in water, which composite has a viscosity of 300 mPa·s or less at 25° C. when made into an aqueous suspension of 3% by weight of the composite.

2. A composite according to claim 1, which has a colloidal content of less than 65%.

3. A process for producing a cellulose-containing composite, which comprises mixing, in a wet state, 20–99% by weight of a fine cellulose and 1–80% by weight of at least one low-viscosity water-soluble dietary fiber selected from the group consisting of 1) a hydrolyzed galactomannan, 2) an indigestible dextrin and 3) a mixture of a polydextrose and xanthan gum and/or gellan gum, wherein the total amount of gellan gum and xanthan gum is 0.1% by weight or more but less than 3% by weight of the composite, and then drying the resulting mixture.

4. A process for producing a cellulose-containing composite, which comprises simultaneously mixing and attriting, in a wet state, 20–99% by weight of a depolymerized cellulose and 1–80% by weight of at least one low-viscosity water-soluble dietary fiber selected from the group consisting of 1) a hydrolyzed galactomannan, 2) an indigestible dextrin and 3) a mixture of a polydextrose and xanthan gum and/or gellan gum, wherein the total amount of gellan gum and xanthan gum is 0.1% by weight or more but less than 3% by weight of the composite, and then drying the resulting mixture.

5. A cellulose-containing composite comprising 20–99% by weight of a fine cellulose and 1–80% by weight of a mixture of a polydextrose and xanthan gum and/or gellan gum, wherein the total amount of gellan gum and xanthan gum is 0.1% by weight or more but less than 3% by weight of the composite, in which composite the average particle size of the fine cellulose is 30 μm or less when the composite is dispersed in water, which composite has a viscosity of 300 mPa·s or less at 25° C. when made into an aqueous suspension of 3% by weight of the composite, and which composite has a colloidal content of less than 65%.

6. A cellulose-containing composite set forth in any one of claims 1, 2 and 5 wherein the composite is contained in a foodstuff.

7. A cellulose-containing composite set forth in any one of claims 1, 2 and 5, wherein the composite is contained in a foodstuff, and is disintegrated and dispersed in the form of individual fine cellulose particles.

8. A cellulose-containing composite set forth in any one of claims 1, 2 and 5, wherein the composite is contained in a liquid diet for tube feeding, and is disintegrated and dispersed in the form of individual fine cellulose particles.

* * * * *